United States Patent
Inoue (10) Patent No.: US 9,709,174 B2
(45) Date of Patent: *Jul. 18, 2017

(54) SEALING DEVICE (75) Inventor: Hideyuki Inoue, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/007,883

(22) PCT Filed: Mar. 9, 2012

(86) PCT No.: PCT/JP2012/056060
§ 371 (c)(1),
(2), (4) Date: Sep. 26, 2013

(87) PCT Pub. No.: WO2012/132832
PCT Pub. Date: Oct. 4, 2012

(65) Prior Publication Data
US 2014/0008873 A1     Jan. 9, 2014

(30) Foreign Application Priority Data
Mar. 30, 2011    (JP) ................................ 2011-074361

(51) Int. Cl.
     *F01D 11/02*     (2006.01)
     *F16J 15/44*     (2006.01)
     *F04D 29/10*     (2006.01)

(52) U.S. Cl.
     CPC .......... *F16J 15/441* (2013.01); *F04D 29/106* (2013.01)

(58) Field of Classification Search
     CPC .......... F16J 15/44; F16J 15/441; F16J 15/443; F04D 29/106

(Continued)

(56) References Cited

U.S. PATENT DOCUMENTS 3,726,531 A * 4/1973 Pagan et al. .............. 277/563
3,785,660 A * 1/1974 Bush ............................ 277/559
(Continued)

FOREIGN PATENT DOCUMENTS

CN      2534428 Y    2/2003
JP      S61-147394 U    9/1986
(Continued)

OTHER PUBLICATIONS

Notification of Transmittal of Translation of the International Preliminary Report on Patentability (PCT/IB/338) mailed Oct. 17, 2013, with International Preliminary Report on Patentability (PCT/IB/373) and Written Opinion of the International Searching Authority (PCT/ISA/237), for corresponding international application PCT/JP2012/056060.

(Continued)

*Primary Examiner* — Nathan Cumar
(74) *Attorney, Agent, or Firm* — Law Office of Katsuhiro Arai (57) ABSTRACT

A sealing device is provided with a floating ring between an outer periphery of a rotating shaft and an inner periphery of a casing and is characterized by including a plurality of inversely directed dynamic pressure generation grooves for creating an action whereby a sealed fluid attempting to leak out is pushed back. The plurality of inversely directed dynamic pressure generation grooves are provided in a circumferential direction to the inner peripheral surface of the floating ring, and thereby the amount of leaking of the sealed fluid is reduced and the center of the floating ring and the center of the rotating shaft are matched together.

8 Claims, 8 Drawing Sheets

(58) Field of Classification Search
USPC ....... 277/409, 411, 412, 413, 417, 422, 347, 277/416, 430
See application file for complete search history.

(56) References Cited

U.S. PATENT DOCUMENTS

| | | | | |
|---|---|---|---|---|
| 3,973,781 | A * | 8/1976 | Grorich | 277/559 |
| 4,275,891 | A * | 6/1981 | Boes | 277/400 |
| 4,337,956 | A * | 7/1982 | Hopper | 277/552 |
| 4,348,029 | A * | 9/1982 | Oishi | F16J 15/441 277/422 |
| 4,534,569 | A * | 8/1985 | Ishitani | B63H 23/321 277/351 |
| 4,948,152 | A * | 8/1990 | Kilthau | F16J 15/43 277/347 |
| 5,006,043 | A * | 4/1991 | Katsumata | F04D 29/106 277/422 |
| 5,403,019 | A * | 4/1995 | Marshall | F16J 15/441 277/413 |
| 6,352,265 | B1 * | 3/2002 | Ha | 277/432 |
| 8,215,645 | B1 * | 7/2012 | Aho, Jr. | 277/370 |

FOREIGN PATENT DOCUMENTS

| | | |
|---|---|---|
| JP | H11-094096 A | 4/1999 |
| JP | 2003-097730 A | 4/2003 |
| JP | 2006-046496 A | 2/2006 |

OTHER PUBLICATIONS

International Search Report (ISR) mailed Apr. 10, 2012, issued for International application No. PCT/JP2012/056060.
First Notification of Reasons for Refusal with Search Report issued on Dec. 3, 2014 by the State Intellectual Property Office of China for Chinese counterpart application No. 201280012352.8.
Second Notification of Reasons for Refusal with Search Report issued by the State Intellectual Property Office of China on Jul. 31, 2015 for Chinese counterpart application No. 201280012352.8.

* cited by examiner

SEALING DEVICE

TECHNICAL FIELD

This application is the U.S. National Phase under 35 U.S.C. §371 of International Application PCT/JP2012/056060, filed Mar. 9, 2012, which claims priority to Japanese Patent Application No. 2011-074361, filed Mar. 30, 2011. The International Application was published under PCT Article 21(2) in a language other than English.

BACKGROUND ART

Figure 7:
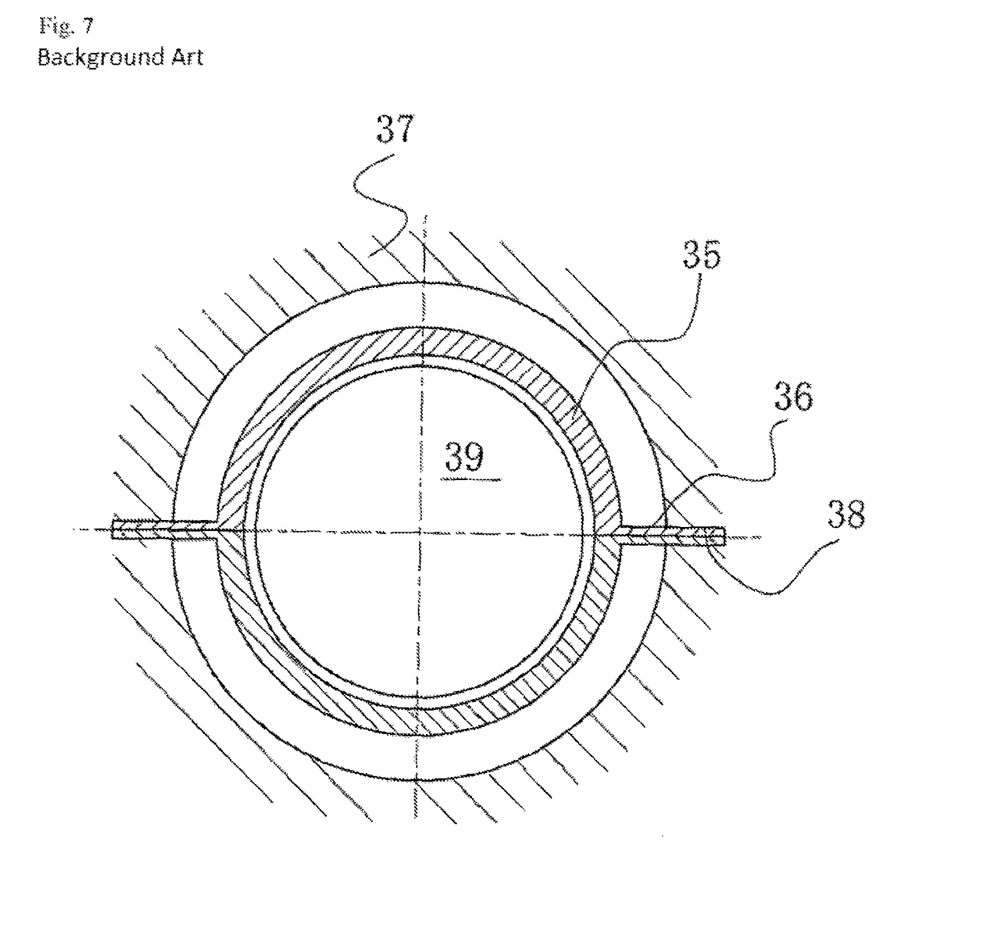
FIG. 7 is a front cross-sectional view illustrating the first prior art.

One example of a known conventional sealing device provided with a floating ring is illustrated in FIG. 7 (hereinafter referred to as the first prior art; for example, see Patent Document 1). In the first prior art, interconnecting parts 36 oriented radially outward are provided to an outer periphery of a floating ring 35 formed in an annular shape. The interconnecting parts 36 are provided as a pair at a 180° interval in the circumferential direction and are inserted into a groove part 38 of a casing 37, thus supporting the floating ring 35 so as to be concentric with a rotating shaft 39.

Figure 8:
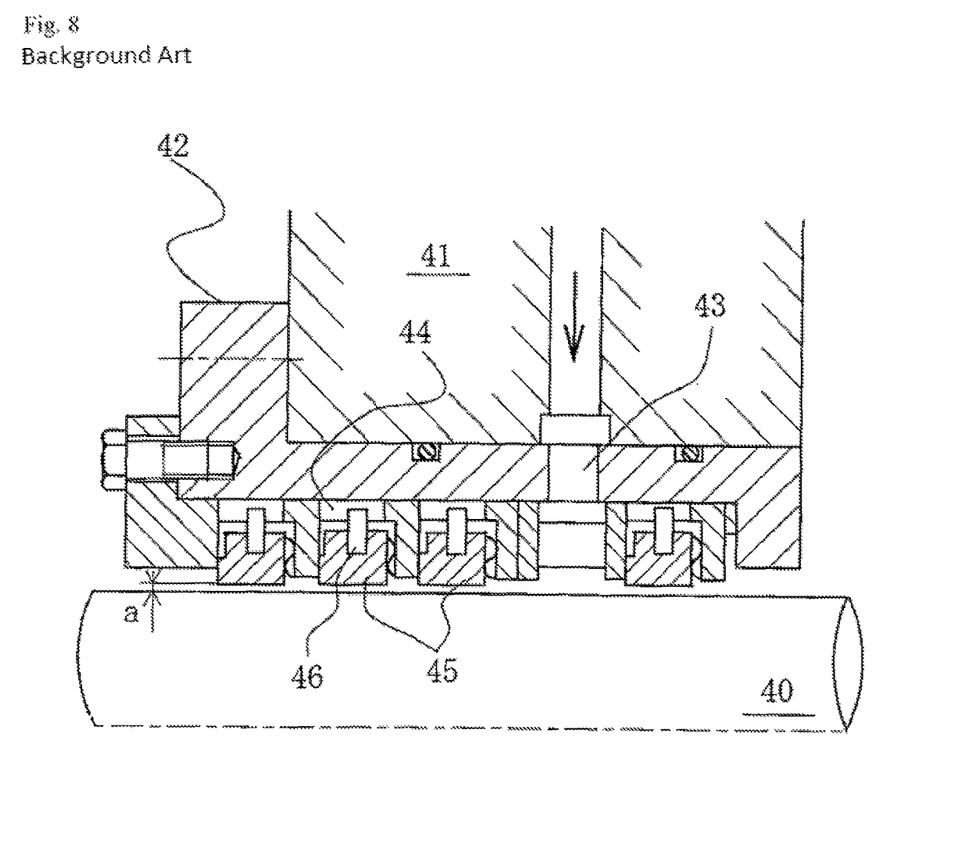
FIG. 8 is a side cross-sectional view illustrating the second prior art.

A different example of another known conventional sealing device provided with a floating ring is illustrated in FIG. 8 (hereinafter referred to as the second prior art; for example, see Patent Document 2). The second prior art is provided with: a rotating shaft 40; a cylindrical casing 42 mounted onto a pump main body 41; a sealing liquid supply port 43 provided so as to penetrate through the pump main body 41 and the cylindrical casing 42; a retainer 44 provided to an inner side of the cylindrical casing 42; an annular floating ring 45 installed on an inner side of the retainer 44; and a rotation-blocking pin 46 provided between the floating ring 45 and the retainer 44. A water film formed in a gap a between an inner peripheral surface of the floating ring 45 and an outer peripheral surface of the rotating shaft 40 allows the floating ring 45 to avoid contact with the rotating shaft 40; also, the floating ring 45 is held and self-aligned so as to be able to float in a direction perpendicular to the radius.

In the sealing device provided with the floating ring in the first prior art illustrated in FIG. 7, the floating ring 35 will not rotate, because the interconnecting parts 36 provided as a pair at a 180° interval in the circumferential direction are inserted into the groove part 38 of the casing 37. However, in practice, it is difficult to assemble the floating ring 35 to be concentric with the rotating shaft 39, and therefore a problem is presented in that the floating ring 35 is assembled in an eccentric state relative to the rotating shaft 39. An additional problem has been presented in that the floating ring 35 is unable to flexibly track the eccentricity of the rotating shaft 39 caused by the deflection of the rotating shaft 39 or a similar factor.

In the sealing device provided with the floating ring in the second prior art illustrated in FIG. 8, although the water film formed in the gap a between the inner peripheral surface of the floating ring 45 and the outer peripheral surface of the rotating shaft 40 provisionally allows the floating ring 45 to be self-aligned, the gap a formed between the inner peripheral surface of the floating ring 45 and the rotating shaft 31 will not be uniform in a case where the dynamic pressure generated at the portion where the gap between the inner peripheral surface of the floating ring 45 and the rotating shaft 40 is small is less than the weight of the floating ring 45, and thus operation will take place in an eccentric state.

CITATION LIST

Patent Literature

Patent Document 1: Japanese Laid-open Patent Application No. 2003-97730
Patent Document 2: Japanese Laid-open Patent Application No. 11-94096

SUMMERY OF INVENTION

Technical Problem

In a case where it is not possible to match together the center of the rotating shaft and the center of the floating ring, as in the first prior art and the second prior art described above, it is necessary to set the gap therebetween to be larger, in order to prevent contact between the floating ring and the rotating shaft.

As a result, a problem has been presented in that there has been a large amount of sealing fluid leaking, proportional to the cube of the gap.

An object of the present invention is to provide a sealing device provided with a floating ring, wherein an inner peripheral surface of the floating ring is provided with inversely directed dynamic pressure generation grooves for creating an action whereby a sealed fluid is pushed back upstream, to thereby reduce the amount of leaking of the sealed fluid, and wherein also the dynamic pressure generated by the dynamic pressure generation grooves is employed to make it possible to match together the center of the floating ring and the center of the rotating shaft.

Solution to Problem

In a first aspect of the present invention intended to achieve the foregoing object, a sealing device provided with a floating ring between an outer periphery of a rotating shaft and an inner periphery of a casing is characterized in that a plurality of inversely directed dynamic pressure generation grooves for creating an action whereby a sealed fluid attempting to leak out is pushed back are provided in the circumferential direction to the inner peripheral surface of the floating ring.

In a second aspect of the sealing device of the present invention, a sealing device provided with a floating ring between an outer periphery of a rotating shaft and an inner periphery of a casing is characterized in that a barrier fluid supply hole for supplying a barrier fluid toward an inner peripheral surface of the floating ring is provided, and a plurality of inversely directed dynamic pressure generation grooves for creating an action whereby a sealed fluid attempting to leak out is pushed back are provided in the circumferential direction to the inner peripheral surface of the floating ring.

The sealing device according to a third aspect of the present invention is characterized in that, in the characteristics of the second aspect, a plurality of the barrier fluid supply holes are provided in the circumferential direction, an inner periphery groove is provided to the inner peripheral surface of the floating ring so as to connect the plurality of barrier fluid supply holes, and the dynamic pressure generation grooves are installed so as to be connected to the inner periphery groove.

The sealing device according to a fourth aspect of the present invention is characterized in that, in the characteristics of the third aspect, the dynamic pressure generation grooves are provided on the sealed fluid side relative to the inner periphery groove.

The sealing device according to a fifth aspect of the present invention is characterized in that, in the characteristics of the third aspect, the dynamic pressure generation grooves are provided on the atmospheric side relative to the inner periphery groove.

The sealing device according to a sixth aspect of the present invention is characterized in that, in the characteristics of third aspect, the dynamic pressure generation grooves are provided on the sealed fluid side and the atmospheric side of the inner periphery groove.

Advantageous Effects of Invention

The present invention exhibits the following superior effects.

(1) In a sealing device provided with a floating ring, an inner peripheral surface of the floating ring is provided with inversely directed dynamic pressure generation grooves for creating an action whereby a sealed fluid is pushed back upstream, to thereby reduce the amount of leaking of the sealed fluid, and also the dynamic pressure generated by the dynamic pressure generation grooves is employed to make it possible to match the center of the floating ring and the center of the rotating shaft.

It is also possible to achieve favorable dynamic stability during start-up.

(2) Because the center of the rotating shaft and the center of the floating ring can be matched together during the rotation of the rotating shaft, the gap between the inner peripheral surface of the floating ring and the outer peripheral surface of the rotating shaft can be set to be smaller, and the sealing performance of the sealing device can be enhanced. The fluid film thickness can be increased in a balanced manner, and therefore it is possible to reduce the risk of contact between the inner peripheral surface of the floating ring and the outer peripheral surface of the rotating shaft.

(3) In addition to the effect (1) described above, providing the barrier fluid supply hole(s) for supplying the barrier fluid toward the inner peripheral surface of the floating ring makes it possible to further reduce the amount of leaking of the sealed fluid, because the barrier fluid acts synergistically with the inversely directed dynamic pressure generation grooves, and the sealed fluid attempting to leak out is more effectively pushed back upstream.

BRIEF DESCRIPTION OF DRAWINGS

FIG. 6 illustrates the coaxial state of the rotating shaft and the floating ring, where FIG. 6(*a*) illustrates a history of movement in the radial direction for the floating ring provided with the inversely directed dynamic pressure generation grooves according to the present invention, and FIG. 6(*b*) illustrates a history of movement in the radial direction for a floating ring provided with forwardly directed dynamic pressure generation grooves directed opposite to the direction of the dynamic pressure generation grooves of the present invention;

DESCRIPTION OF EMBODIMENTS

Modes for carrying out the sealing device according to the present invention shall now be described in detail, with reference to the accompanying drawings, but are not intended to be construed as limiting the present invention. Provided that there is no departure from the scope of the present invention, a variety of changes, modifications, or improvements are included on the basis of the knowledge of a person skilled in the art.

First Embodiment

Figure 1:
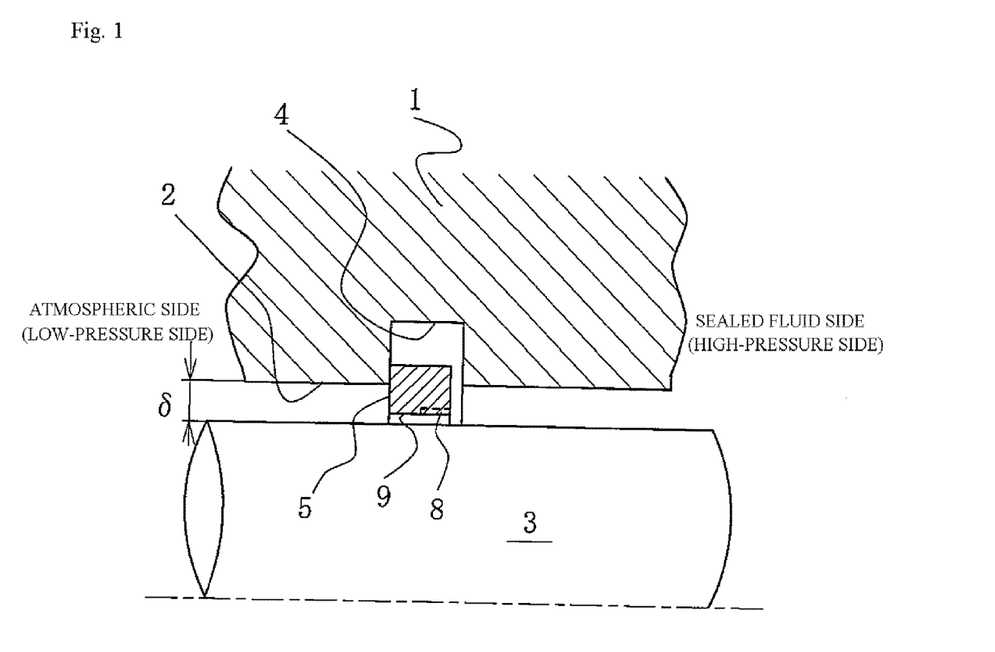
FIG. 1 is a front cross-sectional view schematically illustrating a sealing device according to a first embodiment of the present invention, and illustrates a state where a floating ring has been lifted upward by the rotation of a rotating shaft.

FIG. 1 is a front cross-sectional view schematically illustrating the sealing device according to the first embodiment of the present invention, and illustrates a state where the floating ring has been lifted upward by the rotation of the rotating shaft.

In FIG. 1, a rotating shaft 3 of a pump or the like has been installed so as to penetrate into a hole 2 of a casing 1, where the right side is the sealed fluid side (high-pressure side), and the left is the atmospheric side (low-pressure side). A gap $\delta$ in the radial direction is provided between an inner peripheral surface of the casing 1 and an outer peripheral surface of the rotating shaft 3, and a hollow, cylindrical floating ring 5 is provided so as to surround the outer periphery of the rotating shaft 3 in order to seal this gap $\delta$. A cylindrical space 4 for accommodating the floating ring 5 is provided inside the casing 1. The diameter and width of the space 4 are greater than the outer diameter and width of the floating ring 5. The inner diameter of the floating ring 5 is also set to be slightly larger than the outer diameter of the rotating shaft 3, and the floating ring 5 is able to move in the radial direction within a constant range. As shall be described below, dynamic pressure generation grooves 8 in an inverse direction for acting so as to push the sealed fluid back upstream are provided to the inner peripheral surface 9 of the floating ring 5.

Figure 2:
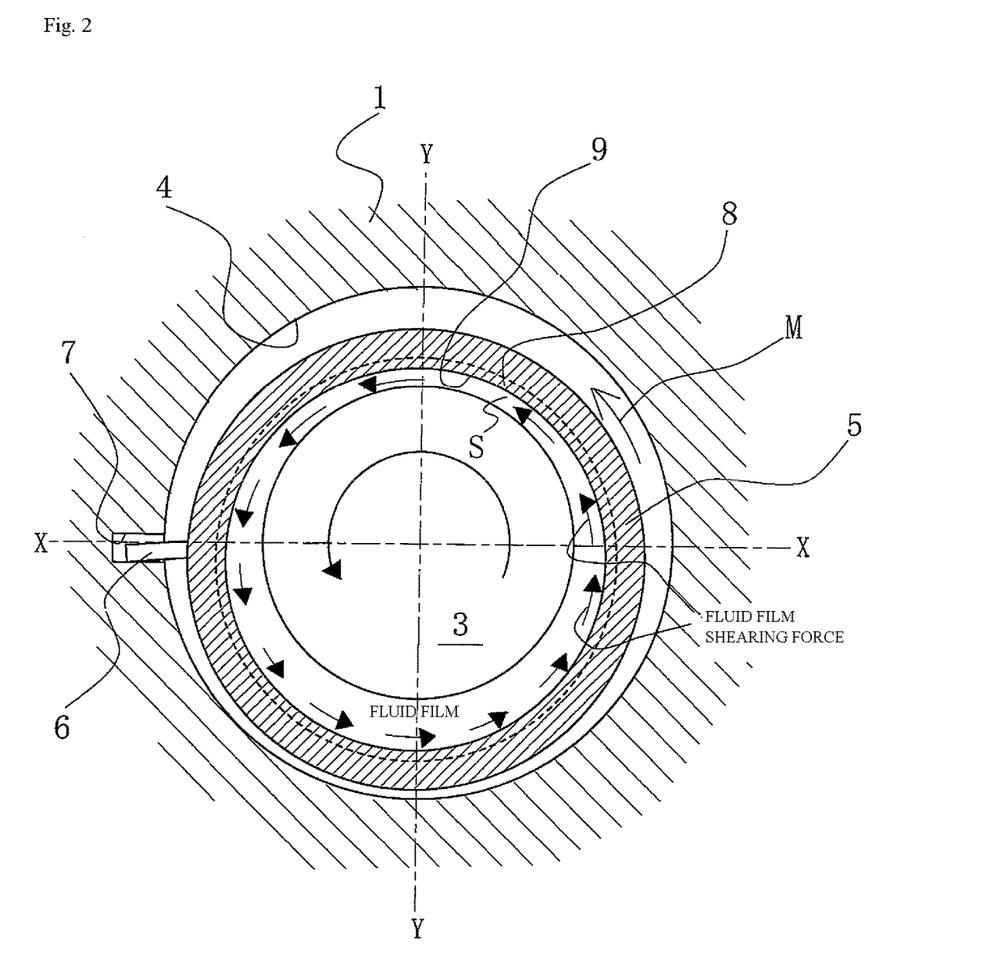
FIG. 2 is a side view schematically illustrating the sealing device according to the first embodiment of the present invention, and illustrates a state where the rotating shaft has begun to rotate.

FIG. 2 is a side view schematically illustrating the sealing device according to the first embodiment of the present invention, and illustrates a state where the rotating shaft has begun to rotate.

In FIG. 2, a turn-stopping pin 6 is provided to a left-side surface of the outer peripheral surface of the floating ring 5 so as to protrude radially outward, and the turn-stopping pin 6 is loosely fitted into a groove 7 provided radially outward from the cylindrical space 4 of the casing 1, thus preventing rotation of the floating ring 5. The turn-stopping pin 6 is provided at a single point in the circumferential direction of the floating ring 5. The location of the turn-stopping pin 6 may be positioned in a second quadrant and a third quadrant in an X-Y coordinate system, the origin of which is the center O of the rotating shaft 3 when the direction of rotation of the rotating shaft 3 is in the counterclockwise direction. However, there is no particular limitation to the location in FIG. 2. Further, the turn-stopping means is not limited to being a pin, provided only that the turn-stopping means have a function for engaging with the casing 1 and preventing the rotation of the floating ring 5.

As illustrated in FIG. 2, when the rotating shaft 3 is in a state of rotating in the counterclockwise direction, a force for lifting up the floating ring 5 is generated by a wedging effect in a gap S of the sealed fluid, the gap being interposed between the rotating shaft 3 and the floating ring 5. In a case where there exists a relationship such that the weight of the floating ring is greater than the force for lifting up the floating ring 5 by the wedging effect between the rotating shaft 3 and the floating ring 5, the center of the floating ring 5 is lower than the center of the rotating shaft 3.

Conversely, in a case where there exists a relationship such that the weight of the floating ring is less than the force for lifting up the floating ring by the wedging effect between the rotating shaft and the floating ring, then the center of the floating ring 5 is above the center of the rotating shaft 3.

In such a state, there will be localized thinning of the fluid film interposed between the outer periphery of the rotating shaft and the inner periphery of the floating ring, and therefore there is a risk of contact between the inner peripheral surface of the floating ring 5 and the outer peripheral surface of the rotating shaft 3 when the behavior of the rotating shaft 3 becomes unstable, such as in the case of abnormal vibrations. In order to avoid such a risk, the gap between the inner peripheral surface of the floating ring 5 and the outer peripheral surface of the rotating shaft 3 must be set in advance so as to be larger. However, when the gap is made larger, a problem is presented in that the amount of leaking of the sealed fluid from this gap increases in proportion to the cube of the gap.

In the present invention, as illustrated in FIGS. 1 and 2, the dynamic pressure generation grooves 8 in the inverse direction for acting so as to push back upstream the sealed fluid during the rotation of the rotating shaft 3, are provided to the inner peripheral surface 9 of the floating ring 5 to thereby reduce the amount of leaking of the sealed fluid. Further, the dynamic pressure generated by the dynamic pressure generation grooves 8 is employed to make it possible to match the center of the floating ring 5 and the center of the rotating shaft 3.

Figure 3:
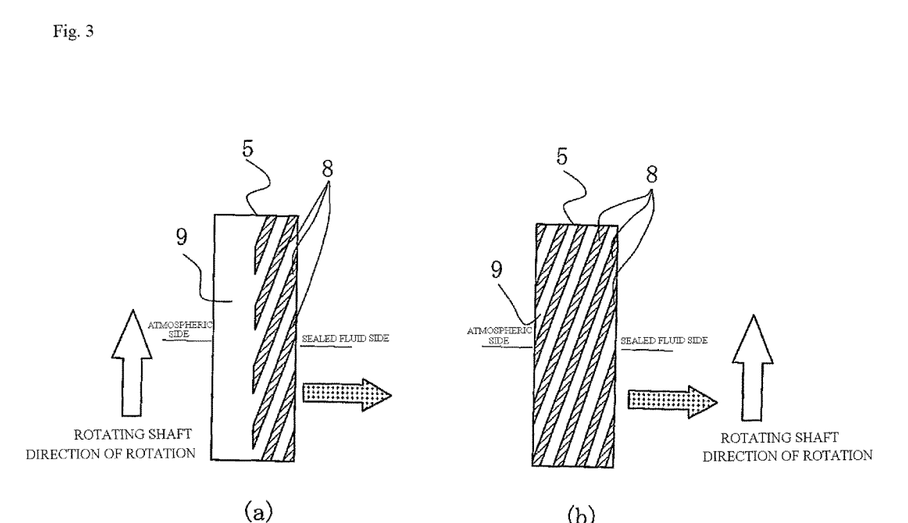
FIG. 3 is a drawing illustrating an example of dynamic pressure generation grooves provided to an inner peripheral surface of the floating ring according to the first embodiment.

FIG. 3 is a drawing illustrating an example of the dynamic pressure generation grooves provided to the inner peripheral surface 9 of the floating ring 5 according to the first embodiment.

In FIGS. 3(a) and 3(b), the right side of the floating ring 5 is the sealed fluid side (high-pressure side) and the left side thereof is the atmospheric side (low-pressure side), and the rotating shaft 3 rotates in the direction of the arrow.

In FIG. 3(a), a plurality of the dynamic pressure generation grooves 8 (hereinafter referred to as the "inversely directed dynamic pressure generation grooves"; the case inverse thereto shall be referred to as the "forwardly directed dynamic pressure generation grooves") for acting so as to push back upstream the sealed fluid, attempting to leak out to the atmospheric side (the low-pressure side) in about half of the sealed fluid side (the high-pressure side) of the inner peripheral surface 9 of the floating ring 5, are provided over the entire periphery of the circumferential direction.

In FIG. 3(b), a plurality of the dynamic pressure generation grooves 8 in the inverse direction for acting so as to push back upstream the sealed fluid attempting to leak out to the atmospheric side (the low-pressure side) over the entire width of the inner peripheral surface 9 of the floating ring 5 are provided to the entire periphery in the circumferential direction.

In the present example, the dynamic pressure generation grooves 8 in the inverse direction make a shape that is inclined about 45° from the atmospheric side toward the sealed fluid side so as to run along the direction of rotation of the rotating shaft 3, and are provided in equal distribution in the circumference.

The dynamic pressure generation grooves 7 may also be provided in unequal distribution in the circumferential direction, and also the angle, number, width, and depth thereof may also be set as appropriate.

The sealed fluid attempting to leak out to the atmospheric side flows into the dynamic pressure generation grooves 8 in the inverse direction and is increasingly pushed out upstream as the incline of the dynamic pressure generation grooves 8 increases, such that some of the fluid is returned as per the arrow, and the amount leaking out to the atmospheric side is reduced. Therein, the dynamic pressure generated by the dynamic pressure generation grooves 8 in the inverse direction act such that the floating ring 5 is made to be concentric to the center of the rotating shaft 3. Specifically, the dynamic pressure generated between the inner peripheral surface 9 of the floating ring 5 and the outer peripheral surface of the rotating shaft 3 is higher at the portion where the gap is smaller and is lower at the portion where the gap is larger, and therefore acts so as to render the gap uniform. As a result, the center of the floating ring 5 is made to be concentric to the axial center of the rotating shaft 3.

At such a time, where the weight of the floating ring 5 is W, the force for lifting up the floating ring 5 by the wedging effect in the gap S between the rotating shaft 3 and the floating ring 5 is F1, the force causing the floating ring 5 move due to the dynamic pressure generated by the dynamic pressure generation grooves 8 in the inverse direction is F2, and the distance in the X direction from the turn-stopping pin 6 at each of the points of action is L1, L2, and L3, respectively. In such a case, the center of the floating ring 5 and the center of the rotating shaft 3 are matched together when the force F2 imparted by the dynamic pressure generated by the dynamic pressure generation grooves 8 in the inverse direction is set such that $W \cdot L1 = F1 \cdot L2 + F2 \cdot L3$. As such, the gap between the inner peripheral surface of the floating ring 5 and the outer peripheral surface of the rotating shaft 3 can be set to be smaller, and the sealing performance of the sealing device can be enhanced.

Further, because the fluid film thickness can be increased in a balanced manner, the risk of contact between the inner peripheral surface of the floating ring 5 and the outer peripheral surface of the rotating shaft 3 can be reduced.

In a case where, for example, the weight of the floating ring 5 is large and the moment $W \cdot L1$ thereof surpasses the moment $F1 \cdot L2$ imparted by the force for lifting up the floating ring 5 due to the wedging effect in the gap S between the rotating shaft 3 and the floating ring 5 and the moment F2·L3 imparted by the force for causing the floating ring 5 to move due to the dynamic pressure generated by the dynamic pressure generation grooves 8, then the dynamic pressure generation grooves 8 located in a first quadrant, or the first quadrant and a second quadrant, of the inner peripheral surface 9 of the floating ring 5 may be deepened or may be brought closer together to create an upwardly oriented F2 in the X-Y coordinate system where the origin thereof is the center O of the rotating shaft 3.

Conversely, in a case where the moment F1·L2 imparted by the force for lifting up the floating ring 5 due to the wedging effect in the gap S between the rotating shaft 3 and the floating ring 5 and the moment F2·L3 imparted by the force for causing the floating ring 5 to move due to the dynamic pressure generated by the dynamic pressure generation grooves 8 surpass the moment W·L1 imparted by the weight of the floating ring 5, then the dynamic pressure generation grooves 8 located in a fourth quadrant, or a third quadrant and the fourth quadrant, of the inner peripheral surface 9 of the floating ring 5 may be deepened or may be brought closer together to create a downwardly oriented F2.

Second Embodiment

Figure 4:
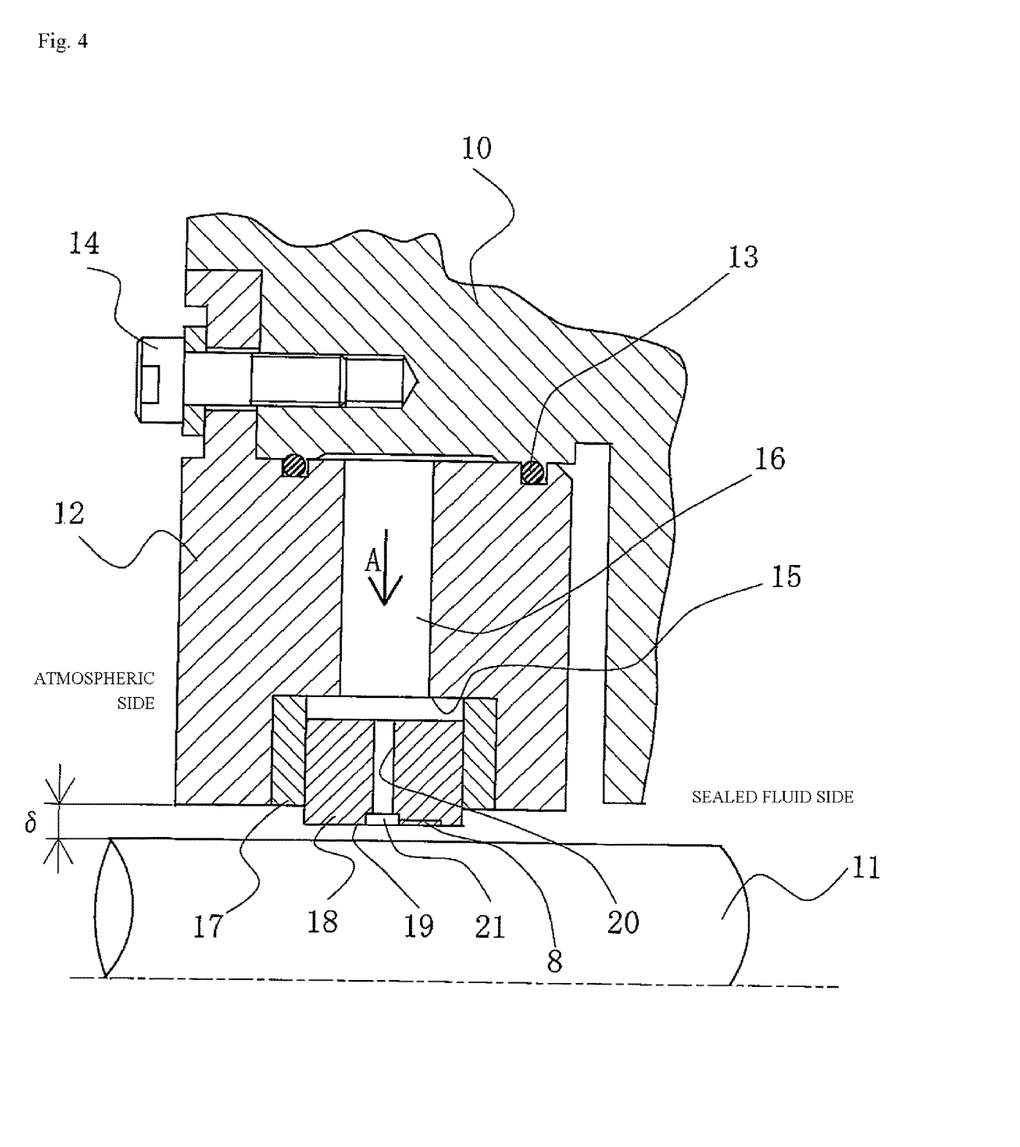
FIG. 4 is a front cross-sectional view schematically illustrating a sealing device according to a second embodiment of the present invention, and illustrates a state where a floating ring has been lifted upward by the rotation of a rotating shaft.

FIG. 4 is a front cross-sectional view schematically illustrating a sealing device according to a second embodiment of the present invention, and illustrates a state where a floating ring has been lifted upward by the rotation of a rotating shaft.

In FIG. 4, a cylindrical casing 12 is installed between a pump main body 10 and a rotating shaft 11. The cylindrical casing 12 is fixed by a bolt 14, with an O-ring 13 interposed between the cylindrical casing 12 and the pump main body 10. A gap δ is provided between an inner peripheral surface of the cylindrical casing 12 and an outer peripheral surface of the rotating shaft 11. On the inner peripheral surface side of the cylindrical casing 12, there is formed a hollow, cylindrical space 15, and there is provided a barrier fluid supply hole 16 for supplying a barrier fluid A inward from outside the radial direction of the casing 12, the barrier fluid supply hole being located at the center of the space 15 in the axial direction.

Retainer rings 17, 17 are provided to both sides inside the hollow, cylindrical space 15, and a floating ring 18 is installed therebetween.

In FIG. 4, the right side is the sealed fluid side and the left side is the atmospheric side. The pressure relation is a relationship where the pressure of the barrier fluid A is greater than the pressure of the sealed fluid, which in turn is greater than the pressure of the air.

There are a plurality of barrier fluid supply holes 20 provided to the floating ring 18 in the circumferential direction inward from radially outward, the barrier fluid supply holes being connected to an inner periphery groove 21 provided to an inner peripheral surface 19 of the floating ring 18. As shall be described below, provided to the inner peripheral surface 19 of the floating ring 18 are dynamic pressure generation grooves 8 in the inverse direction for acting so as to more effectively push back upstream the sealed fluid.

The floating ring 18 may be configured, for example, so as to be halved in the circumferential direction, and may be fixed integrally together by a bolt (not shown). A turn-stopping pin is provided to the floating ring 18, similarly with respect to the case of the first embodiment, and the turn-stopping pin is loosely fitted to a groove of the casing 12, thus preventing rotation of the floating ring 18.

The second embodiment is similar to the first embodiment in that the force for lifting up the floating ring 18 by the wedging effect in the gap S of the sealed fluid is generated when the rotating shaft 3 is in a rotating state, the gap being interposed between the rotating shaft 3 and the floating ring 18. In the second embodiment as well, the inversely directed dynamic pressure generation grooves 8 for creating an action whereby the sealed fluid attempting to leak out during the rotation of the rotating shaft 3 is pushed back upstream are provided to the inner peripheral surface 19 of the floating ring 18, whereby the amount of leaking of the sealed fluid is reduced and the dynamic pressure generated by the dynamic pressure generation grooves 8 in the inverse direction is employed to make it possible to match together the center of the floating ring 18 and the center of the rotating shaft 3.

Figure 5:
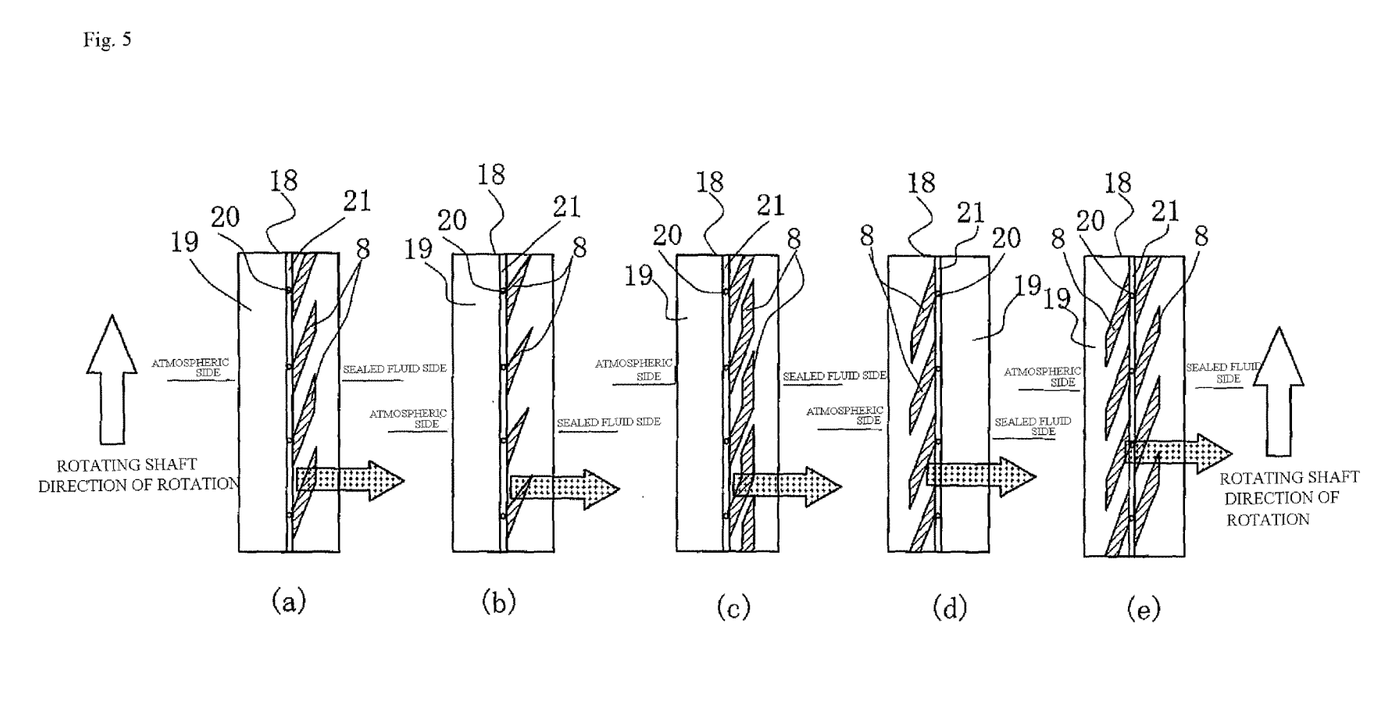
FIG. 5 is a drawing illustrating an example of dynamic pressure generation grooves provided to an inner peripheral surface of the floating ring according to the second embodiment.

FIG. 5 is a drawing illustrating an example of the inversely directed dynamic pressure generation grooves provided to the inner peripheral surface of the floating ring according to the second embodiment.

FIGS. 5(a), 5(b), and 5(c) illustrate examples where the dynamic pressure generation grooves 8 in the inverse direction have been provided so as to be contiguous with the inner periphery groove 21 on the sealed fluid side relative to the inner periphery groove 21 provided to the inner peripheral surface 19 of the floating ring 18. In the present example, the dynamic pressure generation grooves 8 in the inverse direction are provided in equal distribution in the circumferential direction, and the barrier fluid supply holes 20 are provided in the vicinity of the dynamic pressure generation grooves 8.

In FIG. 5(a), the dynamic pressure generation grooves 8 in the inverse direction make a parallelogram shape that is inclined from the atmospheric side toward the sealed fluid side so as to run along the direction of rotation of the rotating shaft 3, and are provided in equal distribution in the circumference.

In FIG. 5(b), the dynamic pressure generation grooves 8 in the inverse direction are shaped to be triangles that are tapered from the inner periphery groove 21 side toward a distal end, this being a point of difference from FIG. 5(a), but are otherwise identical thereto.

The dynamic pressure generation grooves 8 in the inverse direction in FIG. 5(c) are inclined from the atmospheric side toward the sealed fluid side so as to run along the direction of rotation of the rotating shaft 3 from the inner periphery groove 21 side up to the middle of the distal end side, and the distal end side adopts a shape parallel to the direction of rotation of the rotating shaft 3.

At such a time, when the rotating shaft 3 rotates in the direction of the arrow and the barrier fluid A is supplied from the barrier fluid supply holes 20, the high-pressure barrier fluid A flows from the inner periphery groove 21 to both sides thereof, but therein, the barrier fluid A flowing into the dynamic pressure generation grooves 8 in the inverse direction flows toward the sealed fluid side, and sealed fluid attempting to leak out is pushed back in the direction of the arrow. At the same time, the sealed fluid attempting to leak out and flowing into the dynamic pressure generation grooves 8 in the inverse direction is also pushed back in the direction of the arrow. The dynamic pressure generated by the dynamic pressure generation grooves 8 in the inverse direction acts such that the floating ring 18 is made to be concentric to the center of the rotating shaft 3.

FIG. 5(d) illustrates an example where the dynamic pressure generation grooves 8 in the inverse direction are provided so as to be contiguous with the inner periphery groove 21 on the atmospheric side from the inner periphery groove 21 provided to the inner peripheral surface of the floating ring 18. In the present example, the dynamic pressure generation grooves 8 in the inverse direction are provided in equal distribution in the circumferential direction, and the barrier fluid supply holes 20 are provided in the vicinity of the dynamic pressure generation grooves 8. The dynamic pressure generation grooves 8 in the inverse direction make a parallelogram shape that is inclined from the atmospheric side toward the sealed fluid side so as to run along the direction of rotation of the rotating shaft 3, and are provided in equal distribution on the circumference.

In the present example, when the rotating shaft 3 rotates in the direction of the arrow and the barrier fluid A is supplied from the barrier fluid supply holes 20, the high-pressure barrier fluid A also flows from the inner periphery groove 21 to both sides thereof. However, in this case the barrier fluid A flowing into the dynamic pressure generation grooves 8 in the inverse direction flows toward the sealed fluid side, and sealed fluid attempting to leak out is pushed back in the direction of the arrow. At the same time, the sealed fluid attempting to leak out and flowing into the dynamic pressure generation grooves 8 in the inverse direction is also pushed back in the direction of the arrow.

FIG. 5(*e*) illustrates an example where the dynamic pressure generation grooves 8 in the inverse direction are provided so as to be contiguous with the inner periphery groove 21 on both sides of the inner periphery groove 21 provided to the inner peripheral surface of the floating ring 18. In the present example, the dynamic pressure generation grooves 8 in the inverse direction make a parallelogram shape that is inclined from the atmospheric side toward the sealed fluid side so as to run along the direction of rotation of the rotating shaft 3. The dynamic pressure generation grooves 8 on the sealed fluid side and the atmospheric side of the inner periphery groove 21 are provided in equal distribution on the respective circumferences so as to shift the phase in the circumferential direction, and the barrier fluid supply holes 20 are provided located between the left and right dynamic pressure generation grooves 8.

In the case of the present example, when the rotating shaft 3 rotates in the direction of the arrow and the barrier fluid A is supplied from the barrier fluid supply holes 20, the high-pressure barrier fluid A flows from the inner periphery groove 21 to both sides thereof. However, in this case the barrier fluid A flowing into the dynamic pressure generation grooves 8 in the inverse direction flows toward the sealed fluid side, and sealed fluid attempting to leak out is pushed back in the direction of the arrow. At the same time, the sealed fluid attempting to leak out and flowing into the dynamic pressure generation grooves 8 in the inverse direction is also pushed back in the direction of the arrow.

Figure 6:
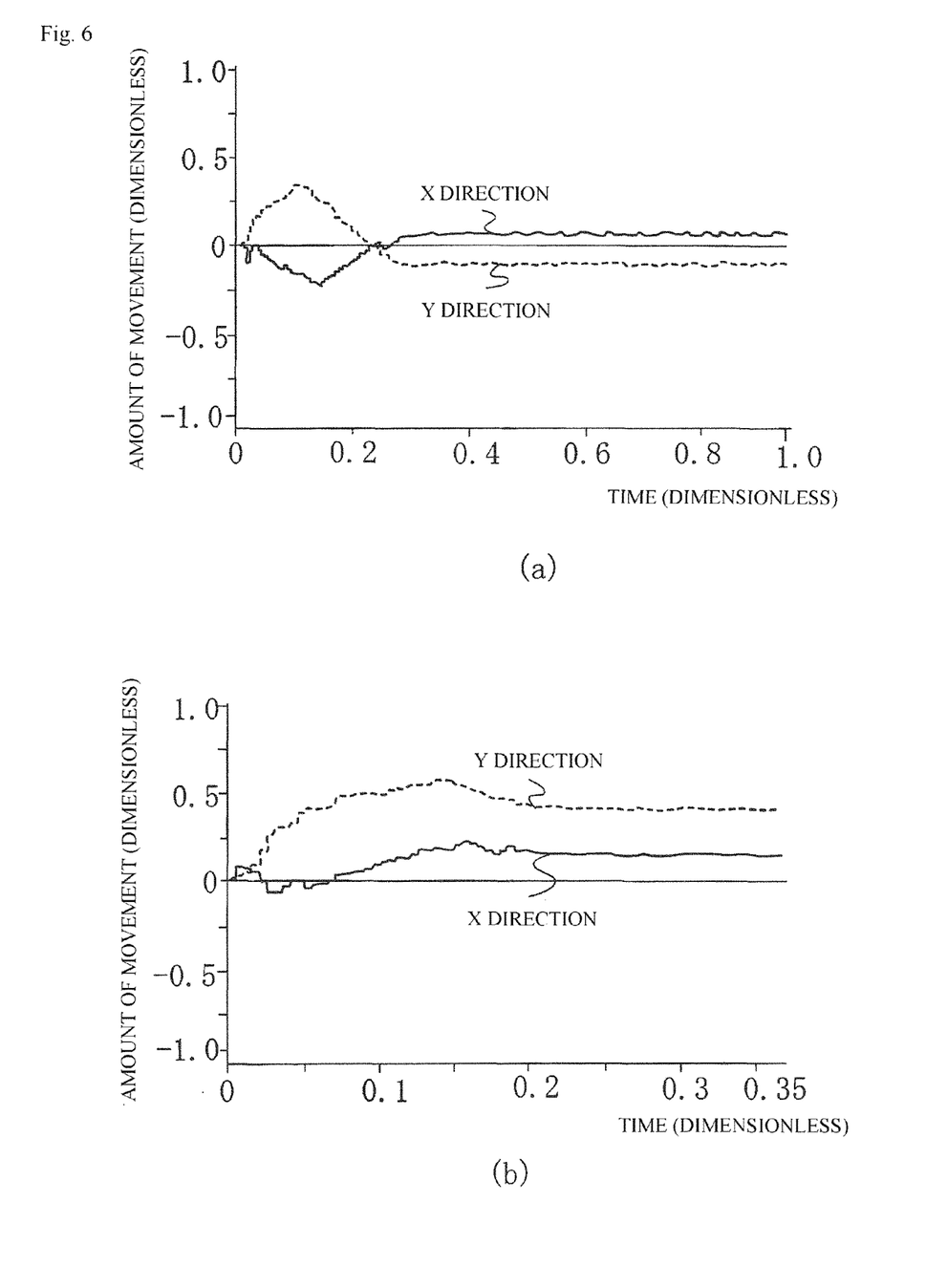

FIG. 6 illustrates the coaxial state of the rotating shaft and the floating ring, where FIG. 6(*a*) illustrates a history of movement in the radial direction for the floating ring provided with the inversely directed dynamic pressure generation grooves according to the present invention, and FIG. 6(*b*) illustrates a history of movement in the radial direction for a floating ring provided with forwardly directed dynamic pressure generation grooves directed opposite to the direction of the dynamic pressure generation grooves of the present invention.

In FIG. 6, the solid line illustrates the amount of movement in the X direction, and the dashed line illustrates the amount of movement in the Y direction.

In the case of FIG. 6(*b*) where the forwardly directed dynamic pressure generation grooves are provided, the floating ring moves considerably in the Y direction during start-up, and thereafter, can also be seen to be in a state of remaining slightly more eccentric in the Y direction. The degree of eccentricity during a steady state is large when represented by a dimensionless number, at 5.1.

In comparison thereto, in the case of FIG. 6(*a*) where the inversely directed dynamic pressure generation grooves according to the present invention are provided, the floating ring moves slightly in the X and Y directions during start-up, but can then be seen to be located substantially in the vicinity of the center. The degree of eccentricity during a steady state when represented by a dimensionless number is 2.1.

These results show that in the case where the forwardly directed dynamic pressure generation grooves are provided, the degree of eccentricity is high, which is a problem. In contrast, in a case where the inversely directed dynamic pressure generation grooves according to the present invention are provided, the dynamic stability during start-up is favorable, the degree of eccentricity is low, and the coaxial state between the rotating shaft and the floating ring is favorable.

REFERENCE SIGNS LIST

1 Casing
2 Hole
3 Rotating shaft
4 Cylindrical space
5 Floating ring
6 Turn-stopping pin
7 Groove
8 Dynamic pressure generation groove in the inverse direction
9 Inner peripheral surface of the floating ring
10 Pump main body
11 Rotating shaft
12 Cylindrical casing
13 O-ring
14 Bolt
15 Hollow, cylindrical space
16 Barrier fluid supply hole provided to the casing
17 Retainer ring
18 Floating ring
19 Inner peripheral surface of the floating ring
20 Barrier fluid supply hole provided to the floating ring
21 Inner periphery groove
δ Gap between the casing and the rotating shaft
S Gap between the rotating shaft and the floating ring
M Moment of rotation

The invention claimed is:
1. A sealing device provided with a floating ring between an outer periphery of a rotating shaft and an inner periphery of a casing, the sealing device being characterized in that:
a plurality of inversely directed dynamic pressure generation grooves for creating an action, whereby a sealed fluid on a sealed fluid side attempting to leak out to an atmospheric side is pushed back upstream and an axis of the floating ring and an axis of the rotating shaft are to be aligned when in use, are provided and discretely aligned along one circle on an inner peripheral surface of the floating ring in a circumferential direction in a manner continuously overlapping each other as viewed in a direction perpendicular to the circumferential direction, all the grooves being inclined with respect to the circumferential direction and closed at least on the atmospheric side, wherein the floating ring is disposed between and in contact with an atmospheric fluid and the sealed fluid that attempts to leak out downstream to the atmospheric fluid along the inner peripheral surface of the floating ring and that is pushed back upstream by dynamic pressure generated by the grooves when in use, and a turn-stopping pin is provided to an outermost peripheral surface of the floating ring facing the inner periphery of the casing so as to protrude radially outward, wherein the turn-stopping pin is loosely fitted into a groove formed radially outward from the inner periphery of the casing so as to allow the floating ring to move to match the center of the floating ring and the center of the rotating shaft by dynamic pressure generated by the grooves when in use.

2. A sealing device provided with a floating ring between an outer periphery of a rotating shaft and an inner periphery of a casing, the sealing device being characterized in that:

a barrier fluid supply hole for supplying a barrier fluid toward an inner peripheral surface of the floating ring is provided, and a plurality of inversely directed dynamic pressure generation grooves for creating an action, whereby a sealed fluid on a sealed fluid side attempting to leak out to an atmospheric side is pushed back upstream and an axis of the floating ring and an axis of the rotating shaft are to be aligned when in use, are provided and discretely aligned along one circle on an inner peripheral surface of the floating ring in a circumferential direction in a manner continuously overlapping each other as viewed in a direction perpendicular to the circumferential direction, all the grooves being inclined with respect to the circumferential direction and closed at least on the atmospheric side, wherein the floating ring is disposed between and in contact with an atmospheric fluid and the sealed fluid that attempts to leak out downstream to the atmospheric fluid along the inner peripheral surface of the floating ring and that is pushed back upstream by dynamic pressure generated by the grooves when in use, and a turn-stopping pin is provided to an outermost peripheral surface of the floating ring facing the inner periphery of the casing so as to protrude radially outward, wherein the turn-stopping pin is loosely fitted into a groove formed radially outward from the inner periphery of the casing so as to allow the floating ring to move to match the center of the floating ring and the center of the rotating shaft by dynamic pressure generated by the grooves when in use.

3. The sealing device according to claim 2, characterized in that a plurality of the barrier fluid supply holes are provided in the circumferential direction, an inner periphery groove is provided to the inner peripheral surface of the floating ring so as to connect the plurality of barrier fluid supply holes, and the dynamic pressure generation grooves are installed so as to be connected to the inner periphery groove.

4. The sealing device according to claim 3, characterized in that the dynamic pressure generation grooves are provided to the inner peripheral surface of the floating ring on the sealed fluid side with reference to the inner periphery groove.

5. The sealing device according to claim 3, characterized in that the dynamic pressure generation grooves are provided to the inner peripheral surface of the floating ring on the atmospheric side with reference to the inner periphery groove.

6. The sealing device according to claim 3, characterized in that the dynamic pressure generation grooves are provided to the inner peripheral surface of the floating ring on the sealed fluid side and the atmospheric side of the inner periphery groove.

7. The sealing device according to claim 1, wherein the dynamic pressure generation grooves are arranged such that the dynamic pressure generated by the grooves can keep a center of the floating ring and an axial center of the rotating shaft matched when in use.

8. The sealing device according to claim 2, wherein the dynamic pressure generation grooves are arranged such that the dynamic pressure generated by the grooves can keep a center of the floating ring and an axial center of the rotating shaft matched when in use.

* * * * *